United States Patent [19]
Stephenson et al.

[11] 3,989,150
[45] Nov. 2, 1976

[54] PIPE CARRYING ATTACHMENT FOR CONSTRUCTION EQUIPMENT

[76] Inventors: James M. Stephenson, 3228 Lichen Drive, Bartlett, Tenn. 38134; Philip J. Wire, 4134 Auxarms Drive, Apt. 2, Memphis, Tenn. 38128

[22] Filed: Jan. 10, 1975

[21] Appl. No.: 540,115

[52] U.S. Cl............................ 214/147 G; 294/106
[51] Int. Cl.²........................................ B66C 3/04
[58] Field of Search............... 214/147 G, 138, 146; 294/106

[56] References Cited
UNITED STATES PATENTS

| | | | |
|---|---|---|---|
| 3,247,987 | 4/1966 | Lake | 214/147 G |
| 3,651,966 | 3/1972 | Willett | 214/147 G |

*Primary Examiner*—Philip Goodman
*Attorney, Agent, or Firm*—Joseph L. Spiegel

[57] ABSTRACT

An attachment for construction or excavation equipment of the type having means to raise and lower the attachment and to position the attachment at a predetermined and preselected site. The attachment comprises a mounting plate with connectors for connecting the mounting plate to the construction equipment. A turntable depends from the mounting plate and is rotatably connected thereto. A first hydrualic actuator is connected intermediate the mounting plate and the turntable for effecting angular displacement or rotation of the turntable with respect to the mounting plate. A beam is pivotably connected to and depends from the turntable and a second hydraulic actuator interconnects the beam to the turntable for effecting predetermined movement of the beam. Longitudinally spaced apart pipe clamps depend from the beam and comprise at least a pair of jaw members which depend from opposite longitudinal sides of the beam and include a third hydraulic actuator operative to effect separation of the jaws one from the other.

9 Claims, 3 Drawing Figures

PIPE CARRYING ATTACHMENT FOR CONSTRUCTION EQUIPMENT

The purpose of this abstract is to enable the Public and the Patent Office to determine rapidly the subject matter of the technical disclosure of the application. This abstract is neither intended to define the invention of the application nor is it intended to be limiting as to the scope thereof.

SUMMARY OF THE INVENTION AND STATE OF THE PRIOR ART

The present invention relates to an attachment for construction equipment and more particularly relates to an attachment for excavation equipment such as backhoes and the like for grasping pipe and lowering the pipe for correct placement in a trench.

The placement of heavy lengths of pipe such as drain or sewer piping, in deep trenches, requires special rigs or equipment placed externally of the trench and necessitates special handling by a crew for laying the pipe in the trench adjacent other lengths of pipe in the trench. Such ancillary rigs and equipment are expensive and usually require extra manpower for laying the pipe in the trench. Additionally, in certain instances where the trench is only partially dug first, the equipment employed to dig the trench stands idle while the pipe is layed in the trench.

In view of the above, it is a principal object of the present invention to provide a novel attachment for construction or excavating equipment which may easily be connected to and disconnected from the equipment and which attachment may be used to position pipe or the like in trenches.

Another object of the present invention is such an attachment capable of independent degrees of freedom to compensate for the slope of the trench, and its angle relative to the equipment thereby minimizing the necessity of movement of the equipment when laying pipes.

Still another object is such an attachment which is simple in construction and yet capable of being connected to and powered by standard earth moving equipment to facilitate independent movement thereof when picking up, moving and laying pipe.

A further object is such an attachment which may be powered by existing hydraulic powering equipment in the earth moving or construction equipment.

Other objects and a more complete understanding of the invention may be had by referring to the following specification and claims taken in conjunction with the accompanying drawing in which:

Figure 1:
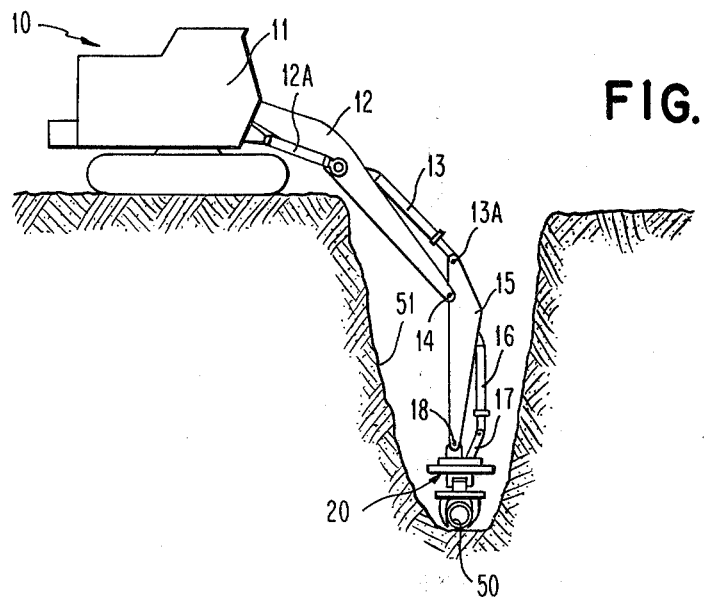
FIG. 1 is a schematic view of a typical piece of heavy construction or earth moving equipment such as a backhoe to which an attachment constructed in accordance with the present invention is connected, and illustrating the laying of pipe by the equipment and attachment in a trench.

Referring now to the drawing, and especially FIG. 1 thereof, a typical piece of construction or earth moving equipment 10 is illustrated with an attachment 20, constructed in accordance with the present invention, laying pipe 50 in a trench and the like 51. The construction equipment 10 may be a backhoe such as a Koehring 1066D hydraulic hoe, and may include the typical cab 11 from which extends a boom 12, lift cylinders 12A on either side of the boom, and a dig cylinder 13. As schematically illustrated in FIG. 1, the boom 12 is pivotally connected as at 14 to a dig arm 15, the dig cylinder 13 being pivotally connected as at 13A to the arm 15 to effect rotation of the arm 15 about the pivot 14. The arm 15 is provided with a bucket or dipper ram 16 with associated links 17 for connection to the conventional bucket or dipper (not shown). In a like manner, the arm 15 is provided with a pivot connection as at 18 for quick connection and disconnection to and from the dipper or bucket.

Figure 2:
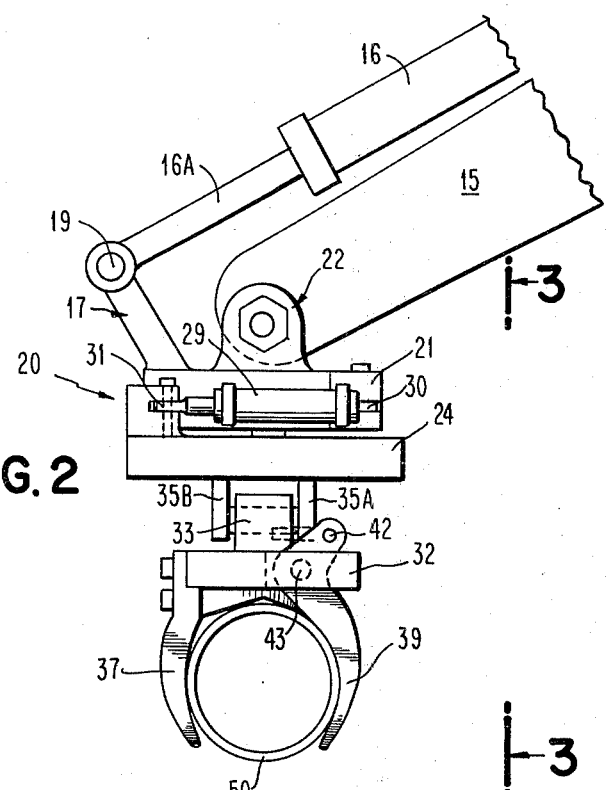
FIG. 2 is an enlarged fragmentary side elevational view of the attachment illustrated in FIG. 1.
Figure 3:
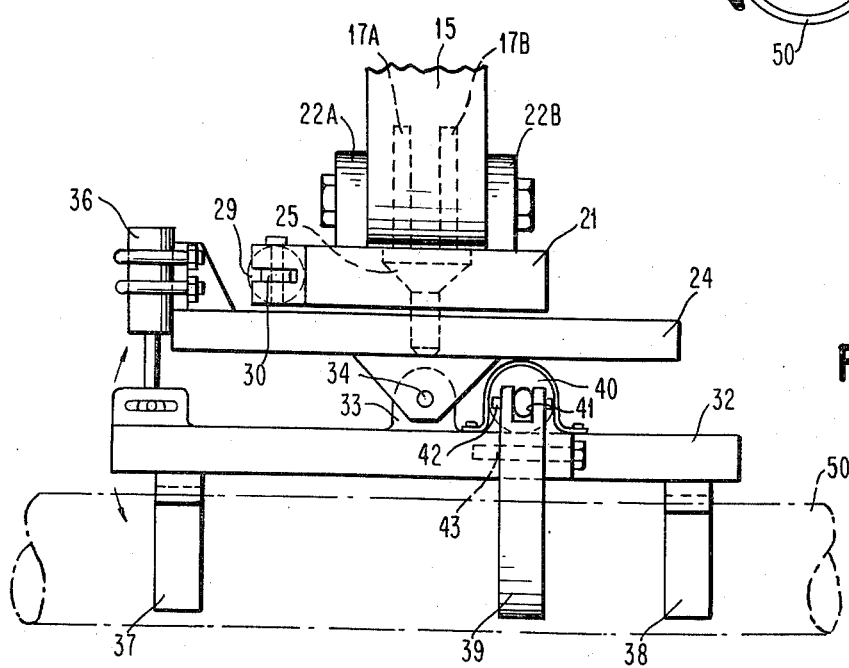
FIG. 3 is a fragmentary sectional view taken along line 3—3 of FIG. 2.

In accordance with the invention, the attachment 20 includes means for quickly coupling the same to the boom arm 15 as well as the bucket ram 16. Additionally, attachment 20 may be powered by the conventional hydraulic system incorporated in such earth moving or construction equipment. To this end and referring first to FIGS. 2 and 3, the attachment comprises a mounting plate 21 having boom arm mounts 22, in the illustrated instance a pair of ears 22A and 22B for connection to the boom arm 15, as by a pin 23. Also extending from the mounting plate 21 are a pair of bucket ram coupling links 17, as best shown in FIG. 3 the links 17A and 17B which, as by the pin 19 are connected to the piston rod 16A of the bucket ram 16.

In a manner which will be more fully explained hereinafter, depending from the mounting plate 21 and rotatably mounted with respect thereto is a turntable 24. The turntable 24 is coupled to the mounting plate 21 as by a roller bearing 25 which permits rotation of the turntable 24 about an axis perpendicular to the plane of the turntable.

Figure 4:
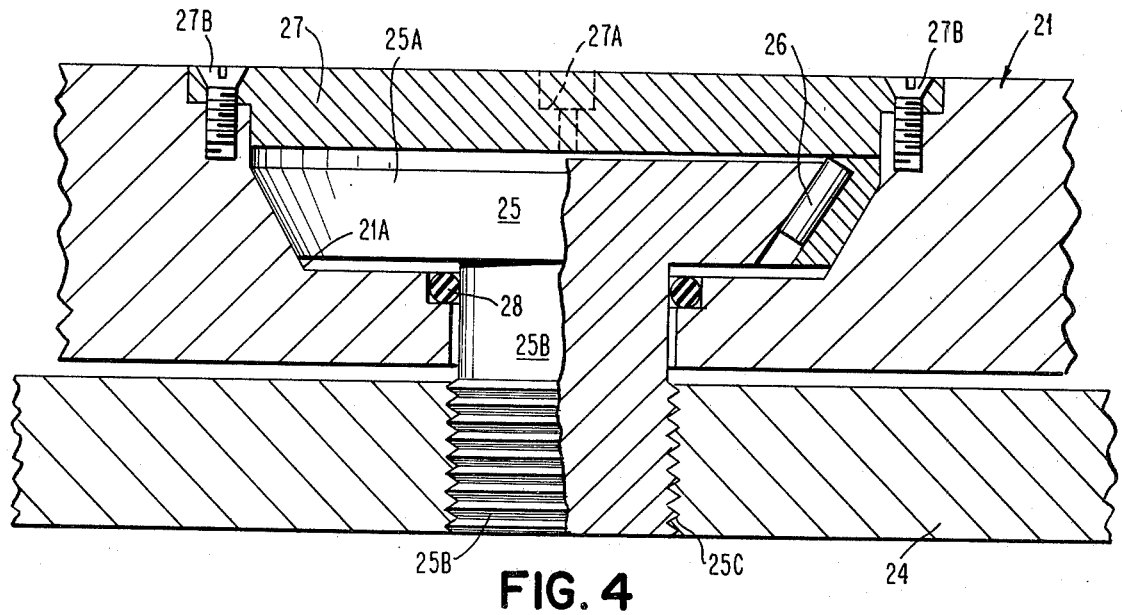
FIG. 4 is an enlarged fragmentary sectional view of a portion of the attachment illustrated in FIGS. 2 and 3; and, FIG. 5 is a fragmentary sectional view in plan of the apparatus illustrated in FIGS. 2 and 3.
Figure 5:
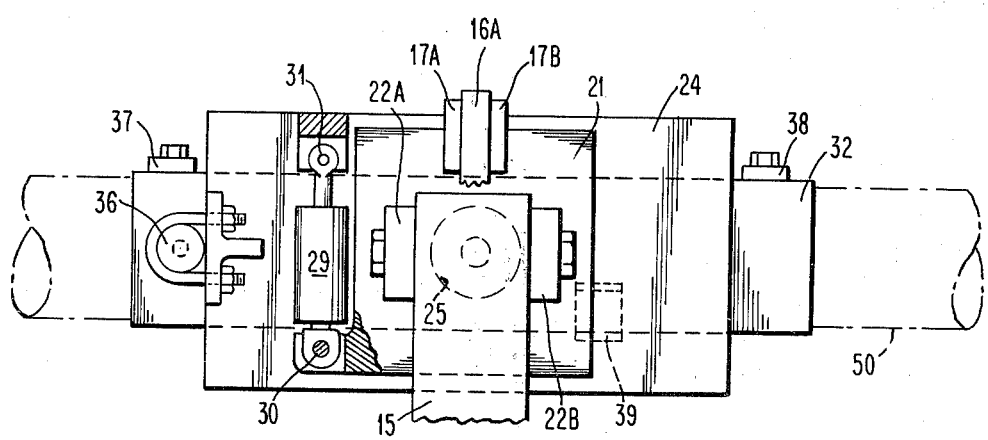

The roller bearing 25 interconnecting the turntable to the mounting plate 21, is designed to take both thrust and rotative loads. To this end and referring now to FIG. 4, the bearing 25 comprises a connecting pin including a frusto-conical upper portion 25A and a threaded depending shaft portion 25B, the shaft portion 25B having threads thereon for coactive engagement as at 25C with threads in the turntable 24. The upper frusto-conical portion 25A is adapted for mating engagement with rollers and the like 26 mounted in a cavity 21A in the mounting plate 21. A cover plate 27 including a central plugged aperture 27A therein (plug not shown) is connected superimposed of the bearing 25 to the mounting plate 21 in a conventional manner as by screws or the like 27B. A grease seal 28 circumscribes the shaft 25B and permits filling of the space or cavity 21A with grease as through the aperture 27A.

In order to effect rotation of the turntable 24 relative to the mounting plate 21, first actuator means, in the present instance, a hydraulic ram 29 is mounted with one end 30 connected to the mounting plate 21 and the other end 31 (the rod of the hydraulic actuator) pivotally mounted to the turntable 24. Typical connecting hydraulic lines (not shown) may be connected to the cab 11 of the machine 10 shown in FIG. 1 for operator control and to permit the turntable to be angularly positioned about the bearing relative to the mounting plate 21.

In order to permit the grasping and positioning for correct placement of pipe 50 in the trench 51, pipe carrier means are provided depending from the turntable 24 to permit grasping of the pipe for lifting and placement thereof in the proper position in a trench. To this end, and as best illustrated in FIGS. 2 and 3, pivotally connected to the turntable 24 and depending therefrom is a beam 32 which is connected to the turntable 24 as by a billet 33, a pivot pin 34 and a pair of lugs 35A and 35B, the lugs being connected to the turntable 24. In this manner, the beam 32 is mounted for rotation about the pivot pin 34.

In order to effect proper control of the beam 32, second actuator means 36 are provided interconnecting the turntable 24 with the beam 32 and mounted so that energization of the second actuator from a remote location such as the cab 11 of the backhoe 10 may permit tilting of the beam 32. In this manner the angular disposition of the pipe 50 may be adjusted to accomodate the slope of the trench bottom for proper positioning and placement of the pipe in the bottom of the trench.

In order to connect the pipe 52 to the beam 32, pipe clamp means depend from the beam, in the present instance the pipe clamp means comprising at least a pair of jaw members, in the illustrated instance a pair of fixed jaw members 37 and 38 and a movable jaw member 39 on the opposite longitudinal side of the beam 32. Third actuator means 40, mounted on the beam and connected to the movable clamp 39 as by a bifurcation 41 and a pin 42, permits actuation of the clamp 39 as about pivot pin 43 mounted in the beam and connecting the jaw member 39.

Thus the attachment of the present invention may be quickly and easily connected to the existing boom of heavy construction equipment or earth moving equipment such as a backhoe. In this manner the same equipment utilized for digging the trench may be also utilized to move the pipe into the trench for proper placement therein and without requiring any ancillary or special rigging equipment. Additionally, the attachment of the present invention permits precise and exact positioning of the pipe by allowing for three degrees of freedom of motion of the pipe clamps or pipe holders. For example, the first actuator or hydraulic ram permits rotating the turntable 24 to a precise angular position in a plane perpendicular to the boom. The second hydraulic actuator 36, acting as a tilt ram permits skewing the beam 32 relative to the turntable so as to accommodate the slope of the bottom of the trench. It should also be recognized that the bucket ram 16 permits rotation of the entire attachment about an axis perpendicular to the plane of the boom (or in the plane of the boom) so that difficult entry or access positions may be attained by the equipment operator. Additionally, the bucket ram may be utilized to effect rotation of the attachment for picking up pipe, for example, from a vehicle and the like.

Although the invention has been described with a certain degree of particularity, it is understood that the disclosure has been made only by way of example and that numerous changes and omissions in the details of construction, the combination and arrangement of parts and the mode of operation may be made without departing from the spirit and scope of the invention as hereinafter claimed.

What is claimed is:

1. An attachment for construction equipment having means to raise and lower said attachment and to position said attachment at a predetermined and preselected site, said attachment comprising:
   a mounting plate and means for connecting said mounting plate to said construction equipment, said means for connecting said mounting plate to said turntable including a thrust-roller bearing;
   a turntable depending from said mounting plate;
   means mounting said turntable for rotation with respect to said plate;
   first actuator means for effecting angular displacement of said turntable with respect to said plate;
   a beam pivotally connected to and depending from said turntable;
   second actuator means connected to said beam for effecting predetermined movement of said beam in a plane substantially perpendicular to said turntable;
   pipe clamp means depending from said beam, said pipe means comprising at least a pair of jaw members; and,
   means to effect separation of said jaws one from the other.

2. An attachment in accordance with claim 1 wherein said thrust-roller bearing comprises a connecting pin having a frusto-conical upper portion and means on its lower portion for attachment to said turntable, a frusto-conical opening in said mounting plate and rollers in said opening for engagement with said upper portion.

3. An attachment in accordance with claim 2 including a cover plate for said bearing and means for applying grease to said bearing through said plate.

4. An attachment in accordance with claim 1 wherein said pipe clamp means comprises at least a pair of longitudinally spaced apart and fixed jaw members connected to said beam, and another movable jaw member spaced apart from said other fixed jaw members.

5. An attachment in accordance with claim 4 wherein said means to effect separation of said jaws includes third actuator means, means pivotally connecting said movable jaw member to said beam, and means coupling said movable jaw member to said third actuator means.

6. An attachment for earth moving equipment, said attachment comprising:
   a mounting plate and means for coupling said mounting plate to said equipment;
   a turntable rotatably connected to said plate and depending therefrom, including a roller bearing intermediate said mounting plate and said turntable whereby said turntable is capable of rotation in a plane substantially parallel to said mounting plate;
   first hydraulic actuator means connected intermediate said mounting plate and said turntable to effect rotation of said turntable;
   pipe carrier means pivotally coupled to said turntable, and second hydraulic actuator means coupled intermediate said pipe carrier means and said turntable to effect tilting of said pipe carrier means relative to said turntable; and,
   said pipe carrier means including jaw means and third hydraulic actuator means for effecting an opening and closing of said jaw means.

7. An attachment in accordance with claim 6 wherein said roller bearing comprises a connecting pin having a frusto-conical portion and a connecting portion, a frusto-conical opening in one of said mounting plate and said turntable and rollers in said opening for coacting engagement with said frusto-conical portion of said connecting pin, and connecting means in the other of said mounting plate and said turntable for coupling engagement with said connecting portion of said pin.

8. An attachment in accordance with claim 6 wherein said pipe carrier means comprises a beam, pivot means interconnecting said turntable to said beam whereby said second actuator means effects movement of said beam in a plane substantially perpendicular to said turntable.

9. An attachment in accordance with claim 8 wherein said jaw means comprises at least a pair of longitudinally spaced apart and jaw members fixed to one longitudinal side of said beam, and another movable jaw member spaced apart from said other fixed jaw members, said third hydraulic actuator means being connected intermediate said movable jaw member and said beam.

* * * * *